United States Patent
Subburasu et al.

(10) Patent No.: US 11,544,137 B2
(45) Date of Patent: Jan. 3, 2023

(54) DATA PROCESSING PLATFORM MONITORING

(71) Applicant: Capital One Services, LLC, McLean, VA (US)

(72) Inventors: Ragupathi Subburasu, Frisco, TX (US); Mayur Gupta, Frisco, TX (US); Ravi Kiran Palamari, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 243 days.

(21) Appl. No.: 16/523,128

(22) Filed: Jul. 26, 2019

(65) Prior Publication Data

US 2019/0370107 A1    Dec. 5, 2019

Related U.S. Application Data

(63) Continuation of application No. 15/994,640, filed on May 31, 2018, now Pat. No. 10,365,964.

(51) Int. Cl.
   *G06F 11/00* (2006.01)
   *G06F 11/07* (2006.01)
   (Continued)

(52) U.S. Cl.
   CPC ........ *G06F 11/0793* (2013.01); *G06F 9/4881* (2013.01); *G06F 11/079* (2013.01);
   (Continued)

(58) Field of Classification Search
   CPC ............. G06F 11/0793; G06F 11/0712; G06F 11/0745; G06F 11/0781; G06F 11/079;
   G06F 11/3476; G06F 11/004; G06F 11/0703; G06F 11/0709; G06F 11/0715; G06F 11/0736; G06F 11/0751; G06F 11/0766; G06F 11/0784; G06F 11/3466; G06F 11/3495; G06F 9/4881;
   (Continued)

(56) References Cited

U.S. PATENT DOCUMENTS 6,195,760 B1    2/2001  Chung et al.
8,836,964 B2 *  9/2014  Boston .................. B65H 43/00
                                                   358/1.14

(Continued)

OTHER PUBLICATIONS

MVP Systems Software Inc., "Failure is not an Option (A.K.A. The Graceful Recovery of Scheduled Batch Processes)," Feb. 16, 2016, 3 pages. Retrieved from Internet:[URL:http://www.jamsscheduler.com/2016/02/16/failure-option/].

(Continued)

*Primary Examiner* — Anthony J Amoroso
(74) *Attorney, Agent, or Firm* — Harrity & Harrity, LLP

(57) ABSTRACT

A device may receive error data indicating that an error occurred, the error being associated with a data processing job scheduled to be performed by a data processing platform. The device may identify input data for the data processing job associated with the error and determine that the error is based on the data processing platform not receiving the input data. In addition, the device may determine a location of the input data and determine a measure of priority associated with the data processing job. Based on the location of the input data and the measure of priority, the device may perform an action to correct the error.

20 Claims, 7 Drawing Sheets

(51) Int. Cl.
    *G06F 9/48*     (2006.01)
    *G06F 11/34*     (2006.01)

(52) U.S. Cl.
    CPC ...... *G06F 11/0712* (2013.01); *G06F 11/0745* (2013.01); *G06F 11/0781* (2013.01); *G06F 11/3476* (2013.01)

(58) Field of Classification Search
    CPC ...... G06F 9/4843; G06F 9/485; G06F 9/4856; G06F 9/5088; G06F 9/5027; G06F 2209/5013
    See application file for complete search history.

(56) References Cited

U.S. PATENT DOCUMENTS

| | | | |
|---|---|---|---|
| 9,262,254 B2* | 2/2016 | Bertosa | H04L 67/12 |
| 9,558,445 B1* | 1/2017 | Rabe | G06F 11/00 |
| 9,576,037 B2* | 2/2017 | Li | G06F 16/254 |
| 9,678,850 B1 | 6/2017 | Rickard et al. | |
| 10,365,964 B1 | 7/2019 | Subburasu et al. | |
| 2004/0153708 A1 | 8/2004 | Joshi et al. | |
| 2004/0205414 A1 | 10/2004 | Roselli et al. | |
| 2004/0225391 A1 | 11/2004 | Fromherz et al. | |
| 2006/0004725 A1 | 1/2006 | Abraido-Fandino | |
| 2006/0015773 A1 | 1/2006 | Singh et al. | |
| 2006/0184939 A1 | 8/2006 | Sahoo et al. | |
| 2008/0127186 A1 | 5/2008 | Kanodia et al. | |
| 2008/0256384 A1* | 10/2008 | Branson | G06F 11/2025 714/4.1 |
| 2008/0276239 A1 | 11/2008 | Collins et al. | |
| 2011/0178831 A1 | 7/2011 | Ravichandran et al. | |
| 2011/0246826 A1 | 10/2011 | Hsieh et al. | |
| 2012/0072765 A1 | 3/2012 | Bower, III et al. | |
| 2012/0324075 A1* | 12/2012 | Bertosa | H04L 67/12 709/223 |
| 2013/0227352 A1 | 8/2013 | Kumarasamy et al. | |
| 2014/0012830 A1* | 1/2014 | Hochwarth | G06Q 10/06 707/E17.007 |
| 2015/0160969 A1* | 6/2015 | Kishore | G06F 11/3006 718/102 |
| 2015/0193504 A1 | 7/2015 | Naidu et al. | |
| 2015/0301861 A1 | 10/2015 | Lachiusa et al. | |
| 2017/0220403 A1 | 8/2017 | Maag et al. | |

OTHER PUBLICATIONS

Oracle, "Batch Failure and Recovery," Mar. 2, 2018, 2 pages. Retrieved from Internet:[URL:https://docs.oracle.com/htmi/E79064_01/Content/Batch%20Processor/Batch_failure_and_recovery.htm].
Safeforce., "Handle Failed Records in Batches," Sep. 2, 2010, 3 pages. Retrieved from Internet:[URL:https://developer.salesforce.com/docs/atlas.enus.api_asynch.meta/api_asynch/asynch_api_batches_failed_records.htm].

\* cited by examiner

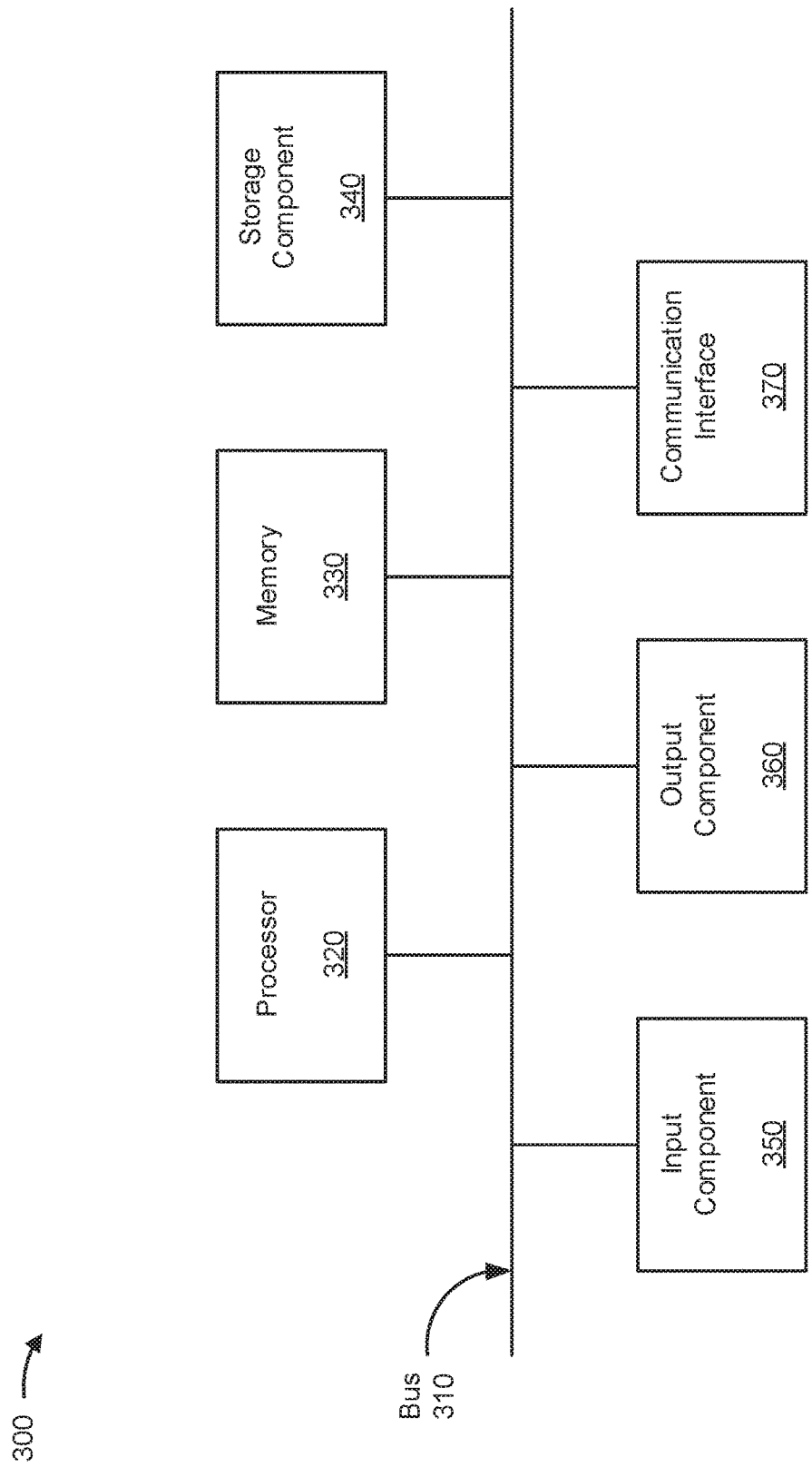

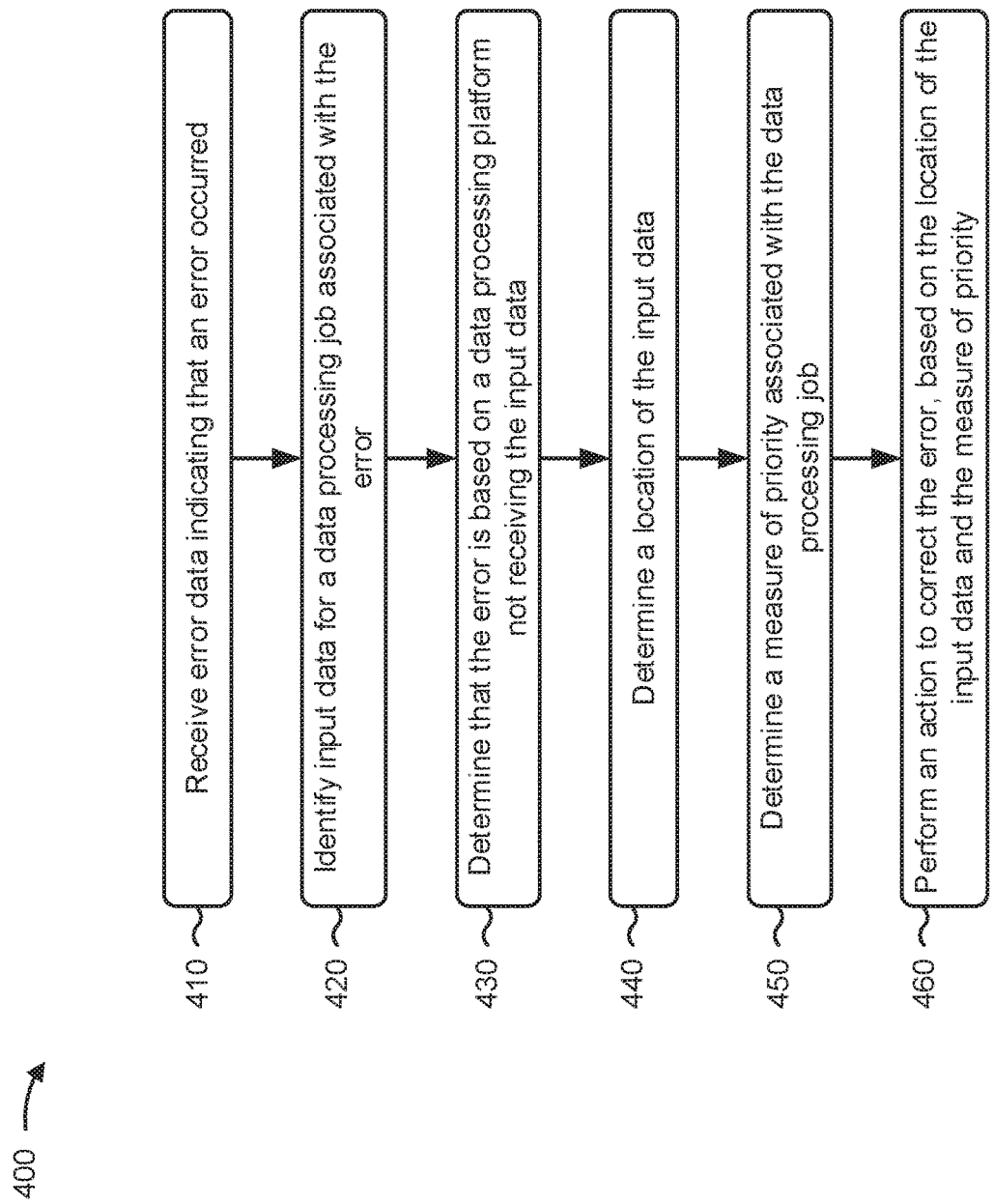

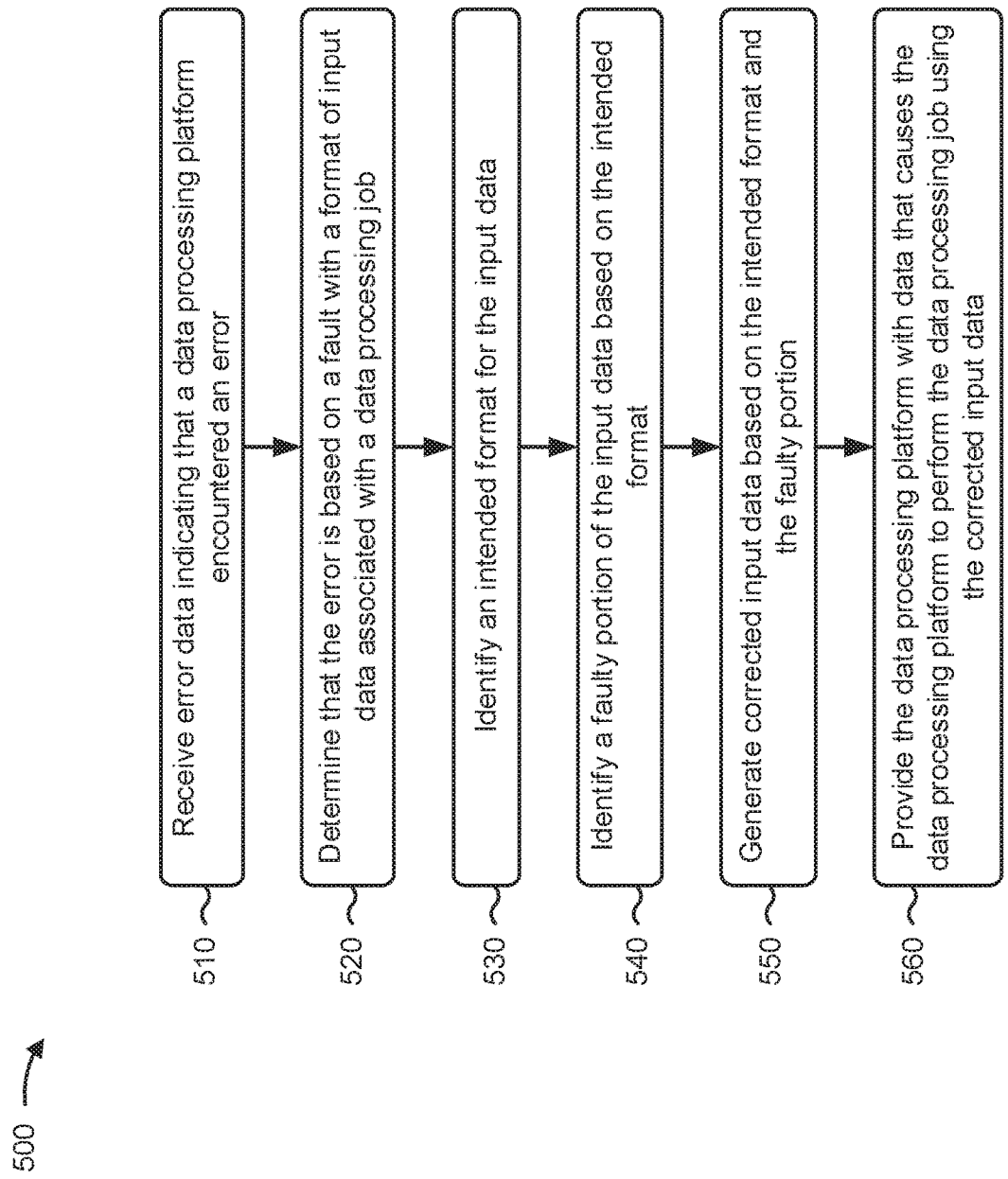

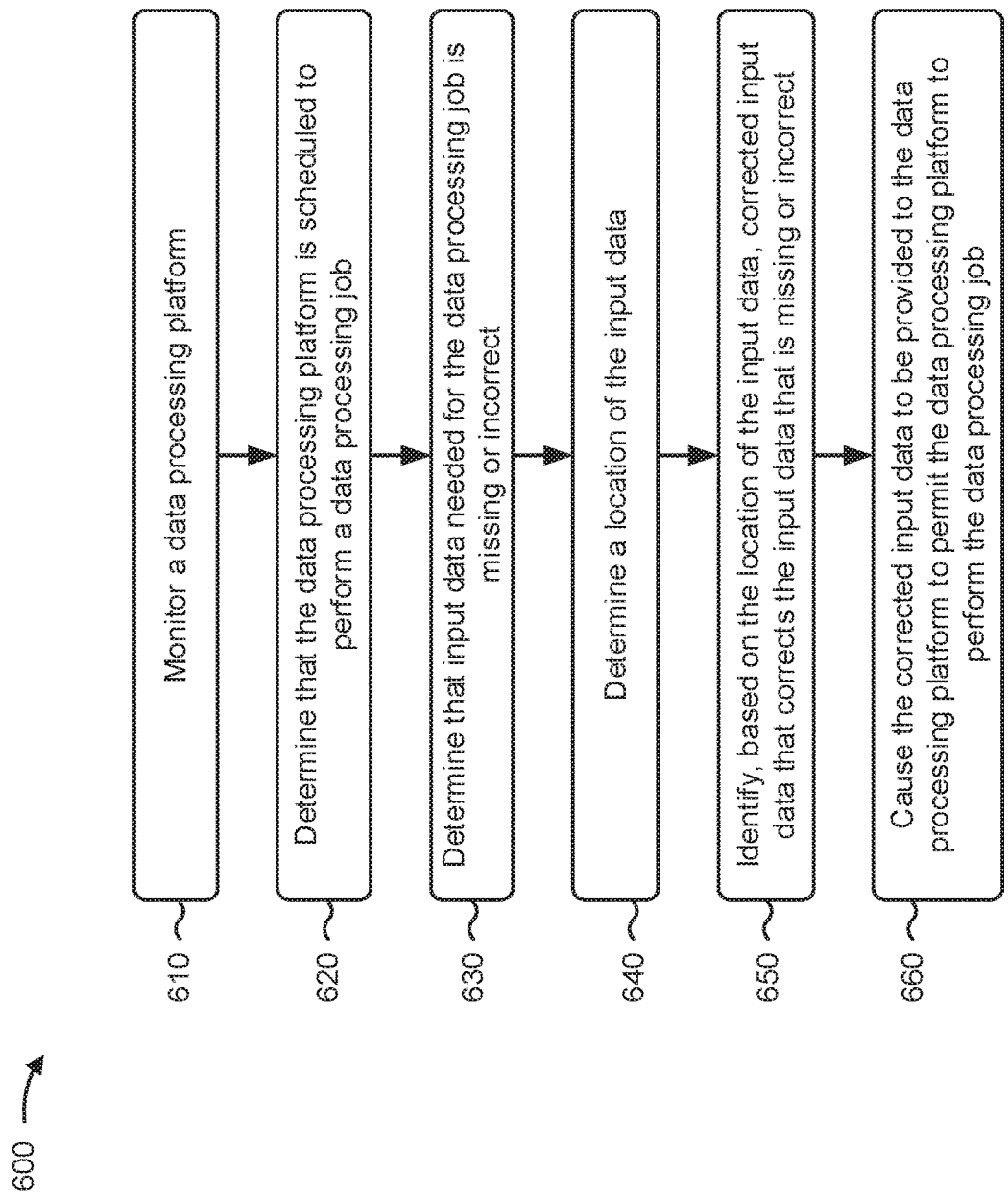

DATA PROCESSING PLATFORM MONITORING

RELATED APPLICATION

This application is a continuation of U.S. patent application Ser. No. 15/994,640, filed May 31, 2018 (now U.S. Pat. No. 10,365,964), which is incorporated herein by reference.

BACKGROUND

Data processing platforms are designed to make use of a pool of computing resources to collect and process data in a variety of ways. For example, a cloud computing platform is a type of data processing platform that may be used to process data in a variety of ways, including the performance of analytics, data sorting, data visualization, and/or the like.

SUMMARY

According to some implementations, a method may comprise: receiving, by a device, error data indicating that an error occurred, the error being associated with a data processing job scheduled to be performed by a data processing platform; identifying, by the device, input data for the data processing job associated with the error; determining, by the device, that the error is based on the data processing platform not receiving the input data; determining, by the device, a location of the input data; determining, by the device, a measure of priority associated with the data processing job; and performing, by the device, an action to correct the error, based on the location of the input data and the measure of priority.

According to some implementations, a device may comprise: one or more memories; and one or more processors, communicatively coupled to the one or more memories, to: receive error data indicating that a data processing platform encountered an error, the error being associated with a data processing job; determine that the error is based on a fault with a format of input data associated with the data processing job; identify an intended format for the input data; identify a faulty portion of the input data based on the intended format, the faulty portion including the fault; generate corrected input data based on the intended format and the faulty portion; and provide the data processing platform with data that causes the data processing platform to perform the data processing job using the corrected input data.

According to some implementations, a non-transitory computer-readable medium may store instructions, the instructions comprising: one or more instructions that, when executed by one or more processors, cause the one or more processors to: monitor a data processing platform; determine that the data processing platform is scheduled to perform a data processing job; determine that input data needed for the data processing job is missing or incorrect; determine a location of the input data; identify, based on the location of the input data, corrected input data that corrects the input data that is missing or incorrect; and cause the corrected input data to be provided to the data processing platform to permit the data processing platform to perform the data processing job.

BRIEF DESCRIPTION OF THE DRAWINGS

FIG. 3 is a diagram of example components of one or more devices of FIG. 2;

FIG. 4 is a flow chart of an example process for monitoring a data processing platform;

FIG. 5 is a flow chart of an example process for correcting faults associated with a data processing platform; and FIG. 6 is a flow chart of an example process for monitoring and correcting faults associated with a data processing platform.

DETAILED DESCRIPTION

Figure 1A:
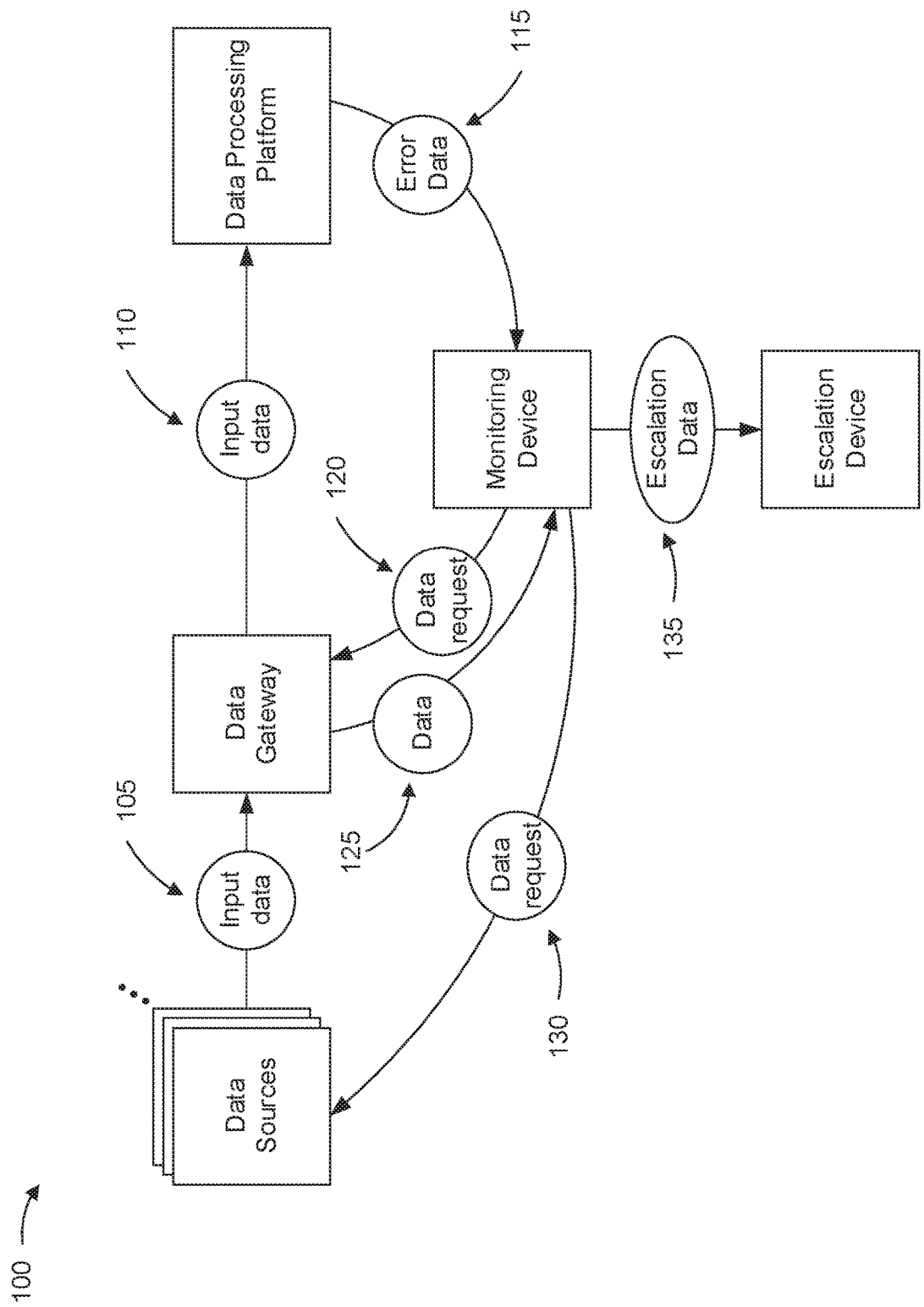
FIGS. 1A-1B are diagrams of overviews of example implementations described herein.

The following detailed description of example implementations refers to the accompanying drawings. The same reference numbers in different drawings may identify the same or similar elements.

Data processing platforms are often designed to perform many data processing jobs. Multiple data processing jobs may be performed by a data processing platform at any given time, and the data used for performing the data processing jobs may come from a variety of data sources. Some data processing jobs may use, as input data, data that comes from a single data source, while other data processing jobs may use input data from a variety of data sources. Data processing jobs are often performed, or executed, by a data processing platform according to a schedule. Due to the variety of potential data processing jobs and data sources involved in a data processing platform, an error during operation of the data processing platform may be particularly disruptive (e.g., disrupting not only a data processing job related to the error, but possibly other data processing jobs as well).

Some implementations, described herein, provide a monitoring device (e.g., a server computer, personal computer, cloud computing platform, and/or the like) to monitor a data processing platform in a manner designed to correct faults related to input data being used by the data processing platform to perform data processing jobs. For example, the monitoring device may monitor a data processing platform and receive error data during the monitoring of the data processing platform. Based on the error data, the monitoring device may take action depending on the type of error specified by the error data. In a situation where the error data indicates that input data is missing, the monitoring device may search for the input data (e.g., by searching an expected input data location and/or a data source) and cause the input data to be provided to the data processing platform to enable the data processing platform to perform the corresponding data processing job. In a situation where the error data indicates that the input data has an error in formatting, the monitoring device may identify an intended format for the input data and use the intended format to correct the input data. After correcting the input data, the monitoring device may cause the corresponding data processing job to be performed. In some implementations, the monitoring device may use a measure of priority associated with a data processing job to determine the manner in which the job should be handled (e.g., escalated to another device, handled immediately, delayed handling, and/or the like).

In this way, a monitoring device may monitor and correct faults related to the input data used by a data processing platform to perform data processing jobs. The ability to monitor and correct faults in input data may significantly reduce computing resources (e.g., processing resources, memory resources, data storage resources, network bandwidth resources, and/or the like) that might otherwise be used in attempting to perform data processing jobs with missing or erroneous input data. In addition, by enabling the quick correction of faults related to input data, the monitoring device may further conserve computing resources by preventing potential issues with related jobs (e.g., in a situation where an error in one data processing job might affect the performance of other data processing jobs, such as data processing jobs that are dependent on one another). In some implementations, the monitoring device may facilitate data processing job scheduling by monitoring and correcting errors in a manner designed to enable faulty data processing jobs to be scheduled, and/or re-scheduled, quickly and in accordance with a priority scheme (e.g., causing data processing jobs to be scheduled based on relative importance). In addition, the monitoring device may also facilitate escalation processes regarding faults with a data processing platform, providing entities within an organization related to the data processing platform with information enabling the entities to handle faults that are not directly corrected by the monitoring device.

Several different stages of the process for monitoring (and/or correcting faults associated with) the data processing platform are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. Finally, automating the process for monitoring and correcting faults associated with data processing jobs conserves computing resources (e.g., processor resources, memory resources, and/or the like) that would otherwise be wasted in attempting to detect missing input data or faults in input data, and computing resources of the device that would be wasted performing data processing jobs using faulty or missing input data.

Figure 1B:
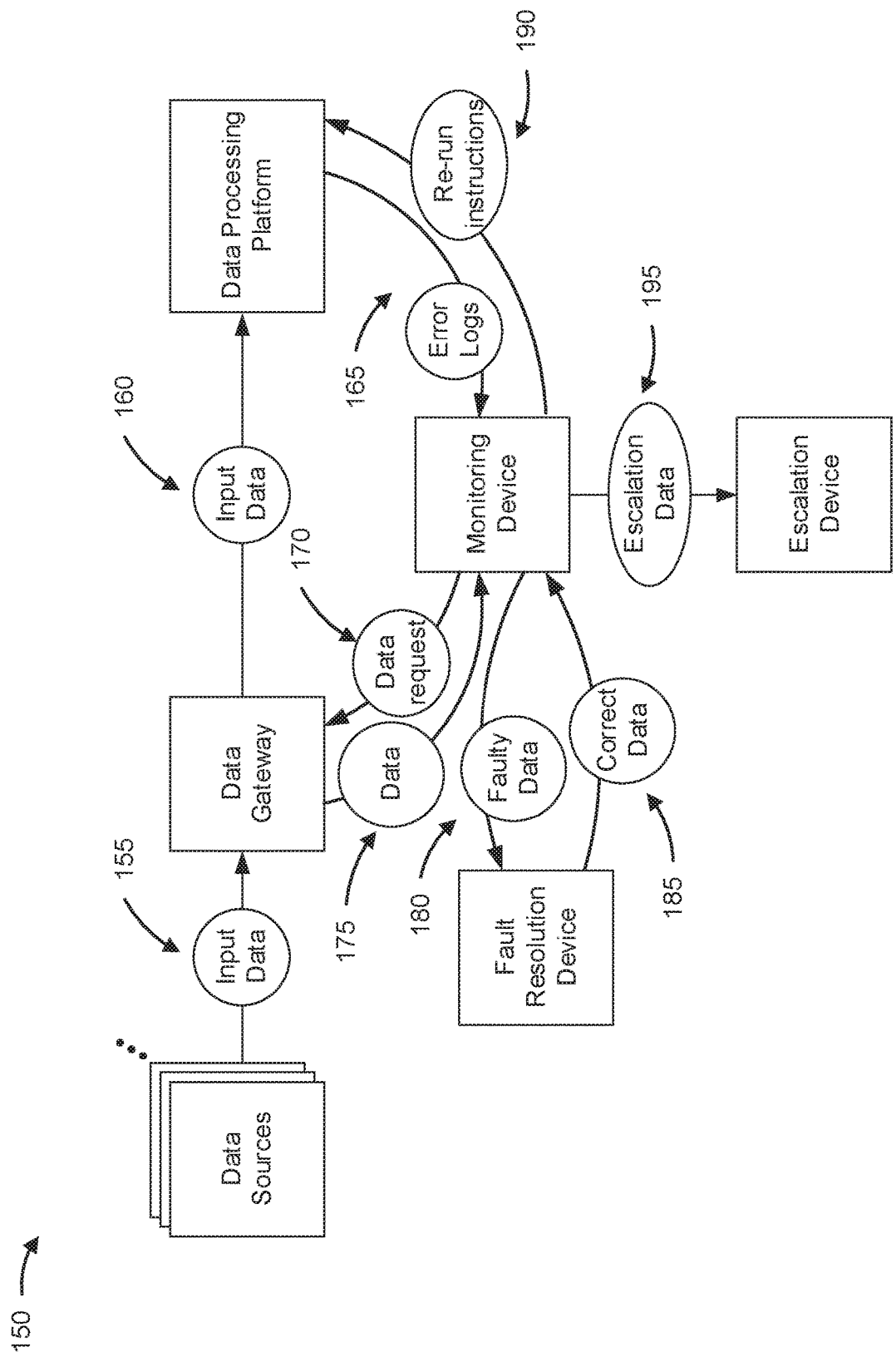

FIGS. 1A-1B are diagrams of overviews of example implementations 100 and 150, described herein. As shown in FIG. 1A, example implementation 100 includes data sources (e.g., databases, personal computers, server computers, smart phones, and/or the like), a data gateway (e.g., a server computer), a data processing platform (e.g., a cloud computing platform, a server computer, and/or the like), a monitoring device (e.g., a server computer, a cloud computing platform, and/or the like), and an escalation device (e.g., a personal computer, a server computer, a cloud computing platform, and/or the like). While the devices of implementation 100 are depicted separately, in some implementations, the functionality of one or more of the devices of implementation 100 may be included in another device, or may be included in multiple, distributed devices.

As shown by reference number 105, the data sources provide input data to the data gateway. The data sources may be any source of data that can be used by the data processing platform, including data aggregators and/or data generators. Examples include user computing devices (e.g., smart phones, laptop computers, Internet of things (IoT) devices, and/or the like) and data aggregating devices (e.g., server computers, database storage devices, and/or the like). In some implementations, some data sources may operate in the same network as the data processing platform and/or data gateway, and in some implementations, some data sources may operate external to the network on which the data processing platform and/or data gateway operate. By way of example, for a data processing platform that performs payment processing (e.g., as a data processing job, or jobs) on behalf of a banking entity, data sources may include merchant devices, payment processors, user payment account providers, and/or the like, which provide the data gateway with information regarding transactions to be processed by the banking entity. As another example, for a data processing platform that performs advertising analytics on behalf of an advertising entity, data sources may include user computing devices, which provide the data gateway with information regarding advertisement viewing, advertisement selection, advertisement conversions, and/or the like.

The data gateway is designed to store data received from the data sources, enabling the data processing platform to access the stored data to perform various data processing jobs. In some implementations, the data gateway may request data from one or more data sources, and in some implementations, the data sources may be configured to automatically provide data to the data gateway. The data provided to the data gateway may be in a variety of formats, which may depend on the data source and/or the intended use of the data. In some implementations, the data gateway may process the data that the data gateway receives from data sources, e.g., in a manner designed to format, correct, or otherwise prepare the data for use by the data processing platform.

As shown by reference number 110, the data processing platform receives input data from the data gateway. The data processing platform generally receives the input data in a manner designed to perform one or more data processing jobs using the input data. Using the payment processing example provided above, the data processing platform may periodically obtain, from the data gateway, batches of transactions to be processed by the data processing platform. In some implementations, the data processing platform receives and processes batches of input data (e.g., multiple records that may be included in one or more files). In some implementations, the data processing platform receives and processes streaming input data (e.g., individual records often included in a single file or network communication).

In some implementations, the data processing platform may perform one or more data processing jobs according to a schedule set by a scheduler (e.g., a scheduling device, process, and/or application that schedules multiple data processing jobs in a manner designed to account for dependencies between data processing jobs, availability of input data for data processing jobs, and efficiency of performing data processing jobs). In this situation, the data processing platform may periodically obtain input data from the data gateway to perform various data processing jobs. In some implementations, the data processing platform performs multiple jobs in parallel.

During the performance, or execution, of data processing jobs, the data processing platform produces log data designed to provide information regarding the status of data processing jobs. When an error occurs, the data processing platform may produce error data associated with the error, e.g., in an error log. The error data may be transmitted to another device and/or be stored in a data structure, such as an error queue, error database, and/or the like. Error data may be produced in a variety of formats, which may depend upon the data processing job to which the error corresponds. In some implementations, error data may be logged and stored in a manner designed to provide information to other entities. For example, rather than using error data to take action, the data processing platform may produce the error data to enable action to be taken by another entity. In some implementations, error data may be used by the data processing platform for a particular purpose, such as stopping an erroneous data processing job, notifying an entity regarding an error or errors, and/or the like.

A variety of different types of errors may occur during the operation of the data processing platform. For example, in a situation where input data is unavailable to the data processing platform, the data processing platform may produce an error indicating that input data for a data processing job is not available. As another example, in a situation where input data contains errors (e.g., errors in the content of the input data, format of the input data, and/or the like), the data processing platform may produce an error indicating that the input data contains content and/or formatting errors. In a situation where the data processing platform encounters an error in the logic of a data processing job (e.g., an error in the instructions provided for the performance of the data processing job), the data processing platform may produce an error indicating the error in the logic of the data processing job. In a situation where the data processing platform encounters an error in the data processing platform itself (e.g., a software and/or hardware failure), the data processing platform may produce an error indicating the error in the data processing platform. Other types of errors may be encountered by the data processing platform, causing the creation of error data related to the error(s).

As shown by reference number 115, the monitoring device obtains error data from the data processing platform. As the data processing platform may produce numerous errors of various types during its operation, the monitoring device is designed to facilitate handling of at least a portion of the errors. In some implementations, the data processing platform provides error data to the monitoring device as the error data is produced, or provides the error data periodically (e.g., when a particular time is reached, when a particular number of errors are produced, and/or the like). In some implementations, the monitoring device actively monitors the data structure(s) that the data processing platform uses to store error data, such as an error queue, error log, error database, and/or the like. In some implementations, the monitoring device may obtain error data for a subset of potential types of error data produced by the data processing platform. For example, the monitoring device may be configured to obtain error data for errors related to input data for data processing jobs, but not error data for errors related to hardware faults of the data processing platform. In this situation, the monitoring device may be one part of a monitoring solution for the data processing platform.

In some implementations, the monitoring device may determine the type of error associated with error data. For example, the monitoring device may determine whether the error data is associated with missing input data, erroneous input data, data processing job logic, data processing platform software, data processing platform hardware, and/or the like. In some implementations, the type of error may be determined based on the content of the error data. For example, the error data may include data designed to identify the error type, such as an error code. As another example, the monitoring device may use pattern matching (e.g., regular expressions) to identify error data based on matching patterns (e.g., certain types of errors may be associated with error data matching a particular format). Using the payment processing job example, the monitoring device may receive error data indicating that the input data (e.g., a batch of transaction data) is missing from the expected input data location associated with the input data.

In some implementations, the monitoring device may obtain error data associated with a data processing job by proactively searching for potential errors that have not yet been encountered by the data processing platform. For example, the monitoring device may detect and obtain error data associated with input data before the data processing platform encounters any error in input data (e.g., by detecting the error(s) before the data processing platform is scheduled to obtain the input data). By way of example, the monitoring device may be aware of an upcoming data processing job based on a data processing job schedule (e.g., provided by a job scheduler), and the monitoring device may also be aware of one or more expected input data locations for the data processing job (e.g., a data storage location previously configured to store input data for the upcoming data processing job). Using the foregoing information, the monitoring device may search for the input data to determine whether the input data for the upcoming data processing job is available at an expected input data location. In a situation where the input data is not available at the expected input data location, the monitoring device may consider this situation an error (e.g., missing input data error) before the data processing platform checks for and determines that the input data is not available. As another example, in a situation where the monitoring device does find the input data available at the expected input data location, the monitoring device may also check the content, format, and/or the like, of the input data to determine whether the input data would produce any errors. By monitoring input data and expected input data locations prior to data processing jobs being performed using the input data, the monitoring device may detect errors, or potential errors, before the errors occur, enabling the monitoring device to proactively take action designed to correct the error(s). Proactively detecting and taking action on errors associated with input data conserves computing resources that would otherwise be wasted performing a data processing job (or failing to perform the data processing job) using faulty or missing input data.

As shown by reference number 120, the monitoring device provides the data gateway with a request associated with the input data that is associated with a particular error. For example, in a situation where the error data indicates that input data is missing or otherwise unavailable to the data processing platform, the monitoring device may determine that the input data is expected to be stored at the data gateway, at an expected input data location. In this situation, the monitoring device may send the data gateway a request for information regarding the input data, e.g., in a manner designed to determine whether the data gateway has the input data needed to perform the corresponding data processing job. As shown by reference number 125, the data gateway provides data in response to the request. The data provided in response to the request may provide a variety of information regarding the input data, such as information indicating that the input data is available at the data gateway, information indicating that the data is unavailable at the data gateway, information indicating one or more data sources from which input data should be provided, and/or the like.

In some implementations, as shown by reference number 130, the monitoring device may provide one or more data sources with a request associated with the input data that is associated with a particular error. For example, in a situation where the input data is missing or otherwise unavailable to the data gateway and/or data processing platform, the monitoring device may request that the one or more data sources, which are associated with the expected input data location, provide the input data to the data gateway and/or data processing platform. The manner in which monitoring device provides the request to the data source(s) may vary, e.g., depending on the data source. For example, in some implementations the data request may include an application programming interface (API) call provided to an application operating on a server computer designed to handle and respond to requests for data. As another example, the data request may be an electronic message transmitted to an entity responsible for providing input data to the data gateway. In this way, the monitoring device may provide data sources with data that causes the data sources to provide the input data needed for performing various data processing jobs, correcting and/or avoiding errors associated with missing or otherwise unavailable input data.

In some implementations, as shown by reference number 135, the monitoring device provides escalation data to an escalation device. An escalation device may be a computing device operated by an entity designed to handle particular types of errors. For example, in some situations, an entity that manages the data processing platform and/or the monitoring device may cause the monitoring device to escalate errors related to particular types of data processing jobs, particular types of errors, and/or particular data sources associated with particular types of errors. For example, a particular data processing job may be identified as a data processing job for which errors associated with input data should be escalated (e.g., to provide special attention to the errors by an administrator). The escalation data may include any information available to the monitoring device regarding an error. By way of example, in a situation where the monitoring device encountered error data indicating that input data was not available for a particular data processing job, and the particular data processing job was previously identified as a data processing job for which escalation should occur in response to an error in input data availability, the monitoring device may include, in the escalation data, the error data associated with the error, the expected input data location, the particular data processing job, and the data source(s) from which input data is expected to be provided. In this way, the monitoring device may enable an entity associated with the escalation device to handle the errors associated with the escalation data.

While the escalation device is depicted separately from the monitoring device, in some implementations the escalation device and the monitoring device may be implemented in the same device or set of devices.

In some implementations, a data processing job may be associated with a measure of priority that indicates, for example, how important a data processing job is relative to other data processing jobs. For example, a data processing job that produces output used by one or more other data processing jobs may have a higher priority than data processing jobs that produce output not needed to perform other data processing jobs. Additionally, or alternatively, a data processing job may be assigned a measure of priority based on the time and/or computing resources required to perform the data processing job (e.g., data processing jobs that require more time and/or computing resources may be assigned a higher or lower measure of priority than data processing jobs that require less time and/or computing resources). Data processing job priority may also be based on scheduling status associated with the data processing job (e.g., earlier scheduled data processing jobs may have a higher priority than later scheduled data processing jobs, and data processing jobs that are late may be assigned a higher priority than data processing jobs that are early or on-time). As another example, a data processing job may be assigned a measure of priority, e.g., by an entity that manages the data processing platform. In some implementations, the monitoring device may determine the measure of priority for a data processing job (e.g., based on any combination of one or more of the foregoing examples). The measure of priority may be, for example, a ranking relative to other data processing jobs, a score capable of being compared to other scores to determine which data processing job has a higher priority, and/or the like.

In implementations where measures of priority are associated with data processing jobs, the measures of priority may be used in a variety of ways. In some implementations, the monitoring device may prioritize handling errors based on the measures of priority. For example, the monitoring device may dedicate more computing resources to handling an error for a data processing job with a higher priority than are dedicated to another error for another data processing job with a lower priority. In some implementations, the monitoring device may determine whether an error should be escalated to an escalation device based on the measure of priority. For example, the monitoring device may send escalation data to an escalation device for errors associated with a data processing job with a measure of priority that meets a priority threshold for escalation. In some implementations, the measure of priority may be used to determine when the monitoring device performs a particular action associated with error data, such as when the monitoring device re-schedules the corresponding data processing job (e.g., described in further detail, below). For example, the monitoring device may intentionally delay the performance of a data processing job based on a corresponding measure of priority, e.g., in a manner designed to enable the data processing platform to perform other data processing jobs that might have a higher priority.

As noted above, the monitoring device may take a variety of actions based on the detecting errors associated with input data, the location of the input data, measures of priority associated with data processing jobs, and/or the like. For example, after determining the location of missing input data, the monitoring device may provide the data gateway and/or a data source associated with the location of the input data with a request to provide input data to the data processing platform. As another example, in implementations where the data processing platform requests the input data from the data gateway or a data source, the monitoring device may provide the data processing platform with data identifying the location of input data that was previously identified (e.g., in error data) as missing or otherwise unavailable. In this way, the monitoring device facilitates the handling of data processing platform errors in a manner designed to quickly identify and handle errors, in some situations prior to their occurrence, enabling the data processing platform to efficiently perform data processing jobs.

As shown in FIG. 1B, example implementation 150 includes an overview of an example that is similar to the example implementation 100 described with respect to FIG. 1A. Example implementation 150 includes data sources, a data gateway, a data processing platform, a monitoring device, an escalation device, and a fault resolution device (e.g., a server device, cloud computing platform device, and/or the like). While example implementation 100 was described with respect to the detection and handling of errors related to missing or otherwise unavailable input data, example implementation 150 depicts the detection and handling of errors related to faulty input data.

As shown by reference number 155, the data sources provide input data to the data gateway, which may be performed in a manner the same as or similar to that described above, with reference to FIG. 1A. For example, the data sources may periodically provide input data to the data gateway, for use in a data processing job executed by the data processing platform. As shown by reference number 160, the data gateway may provide the input data to the data processing platform, which may be performed in a manner the same as or similar to that described above, with reference to FIG. 1A. For example, the data processing platform, when scheduled to execute a particular data processing job, may request and receive the input data from the data gateway. As shown by reference number 165, the monitoring device may obtain error data (e.g., in the form of error logs) from the data processing platform, which may be performed in a manner the same as or similar to that described above, with reference to FIG. 1A. For example, the monitoring device may monitor error logs produced by the data processing platform and/or proactively search for errors associated with the input data used by the data processing platform.

In some implementations, such as implementation 150, the monitoring device may determine that an error is associated with faulty input data (e.g., as opposed to missing or otherwise unavailable input data). For example, faulty input data may be in an incorrect format (e.g., unexpected and/or incompatible characters, file names, character encodings, transmission protocols, and/or the like). In some implementations, the monitoring device determines that input data is faulty based on error data produced by the data processing platform. For example, an error log may include an error code or other information indicating that the input data was identified as faulty. In some implementations, the monitoring device determines that the input data is faulty by using data defining an expected format for input data. For example, monitoring device may include or otherwise have access to data defining the expected format (e.g., a regular expression, input file format identifier, input file size limit, and/or the like) for input data for various data processing jobs, and monitoring device may determine that the input data is faulty based on the format of the input data failing to match the expected format.

In some implementations, as in example implementation 100 described above with respect to FIG. 1A, monitoring device may proactively identify faulty input data. For example (as shown by the example data request shown by reference number 170, and the example data provided in response, as shown by reference number 175), the monitoring device may obtain input data for a data processing job using information identifying the expected input data location. After obtaining the input data, the monitoring device may then perform one or more actions (e.g., regular expression matching) to determine whether the input data is faulty. In a situation where no faults are encountered, the monitoring device may allow the data processing platform to perform the data processing job associated with the input data normally (e.g., as scheduled). In a situation where faulty input data is detected, the monitoring device may take an action or actions designed to correct the faulty input data, as described in further detail, below. As noted above, proactively identifying faults in input data, and correcting those faults, may facilitate conservation of computing resources that might otherwise be wasted on processing faulty input data.

As shown by reference number 180, the monitoring device provides faulty input data to a fault resolution device that is designed to correct errors in input data. The fault resolution device may correct the faults in a variety of ways. For example, in a situation with a faulty file format, the fault resolution device may regenerate the input data in a file of the appropriate format (e.g., based on the expected format). In a situation where the fault is based on the content being formatted improperly (e.g., incompatible characters), the fault resolution device may remove and/or replace the improperly formatted portion of the input data. In a situation where the fault is based on the input data being too large, the fault resolution device may split files that include input data into files of a smaller size. As shown by reference number 185, the monitoring device receives corrected input data from the fault resolution device. For example, after correcting any faults in the input data, the fault resolution device may provide the corrected input data to the monitoring device. In some implementations, the fault resolution device may provide the corrected input data to another device, such as the data gateway, e.g., in a manner designed to enable the corresponding data processing job to make use of the corrected input data. In some implementations, the monitoring device may provide the corrected input data to another device, such as the data gateway or the data processing platform.

While the fault resolution device is depicted separately from the monitoring device, in some implementations the fault resolution device and the monitoring device may be implemented in the same device or set of devices. Additionally, or alternatively, the fault resolution device may be included in the data processing platform (e.g., alone, or in combination with the monitoring device and/or data gateway). Using fault resolution, the monitoring device may be able to correct at least a portion of the errors that are or might be encountered by the data processing platform.

As shown by reference number 190, the monitoring device provides the data processing platform with data that causes the data processing platform to re-run the data processing job using the corrected input data. In a situation where the fault in input data was detected and corrected prior to the data processing platform detecting the error, the monitoring device need not notify the data processing platform, or may instruct the data processing platform to start the data processing job associated with the corrected input data (e.g., for the first time).

As shown by reference number 195, the monitoring device provides escalation data to the escalation device, e.g., in a manner similar to or the same as that described above, with reference to FIG. 1A. For example, the monitoring device may provide escalation data to an escalation device based on the data source, the particular error encountered by the monitoring device, the data processing job associated with the error, and/or a measure of priority associated with a particular data processing job. In some implementations, the monitoring device may provide the escalation device with escalation data based on a data processing job failing (e.g., producing an error based on the input data) after the monitoring device corrected one or more faults with the input data. For example, in a situation where the monitoring device has already corrected faults in input data, but the data processing job still fails, the monitoring device may determine that the error should be escalated.

In this way, a monitoring device may monitor and correct faults related to the input data used by a data processing platform to perform data processing jobs. The ability to monitor and correct faults in input data may significantly reduce computing resources (e.g., processing resources, memory resources, data storage resources, network bandwidth resources, and/or the like) that might otherwise be used attempting to perform data processing jobs with missing or erroneous input data. In addition, by enabling the quick correction of faults related to input data, the monitoring device may further conserve computing resources by preventing potential issues with related jobs (e.g., in a situation where an error in one data processing job might affect the performance of other data processing jobs, such as data processing jobs that are dependent on one another). In some implementations, the monitoring device may facilitate data processing job scheduling by monitoring and correcting errors in a manner designed to enable faulty data processing jobs to be scheduled, and/or re-scheduled, quickly and in accordance with a priority scheme (e.g., causing data processing jobs to be scheduled based on relative importance). In addition, the monitoring device may also facilitate escalation processes regarding faults with a data processing platform, providing entities within an organization related to the data processing platform with information enabling the entities to handle faults that are not directly corrected by the monitoring device.

As indicated above, FIGS. 1A-1B are provided merely as examples. Other examples are possible and may differ from what was described with regard to FIGS. 1A-1B. For example, implementation details and examples described with respect to FIG. 1A may be applicable to the implementation 150 described with respect to FIG. 1B, and implementation details and examples described with respect to FIG. 1B may be applicable to the implementation 100 described with respect to FIG. 1A.

Figure 2:
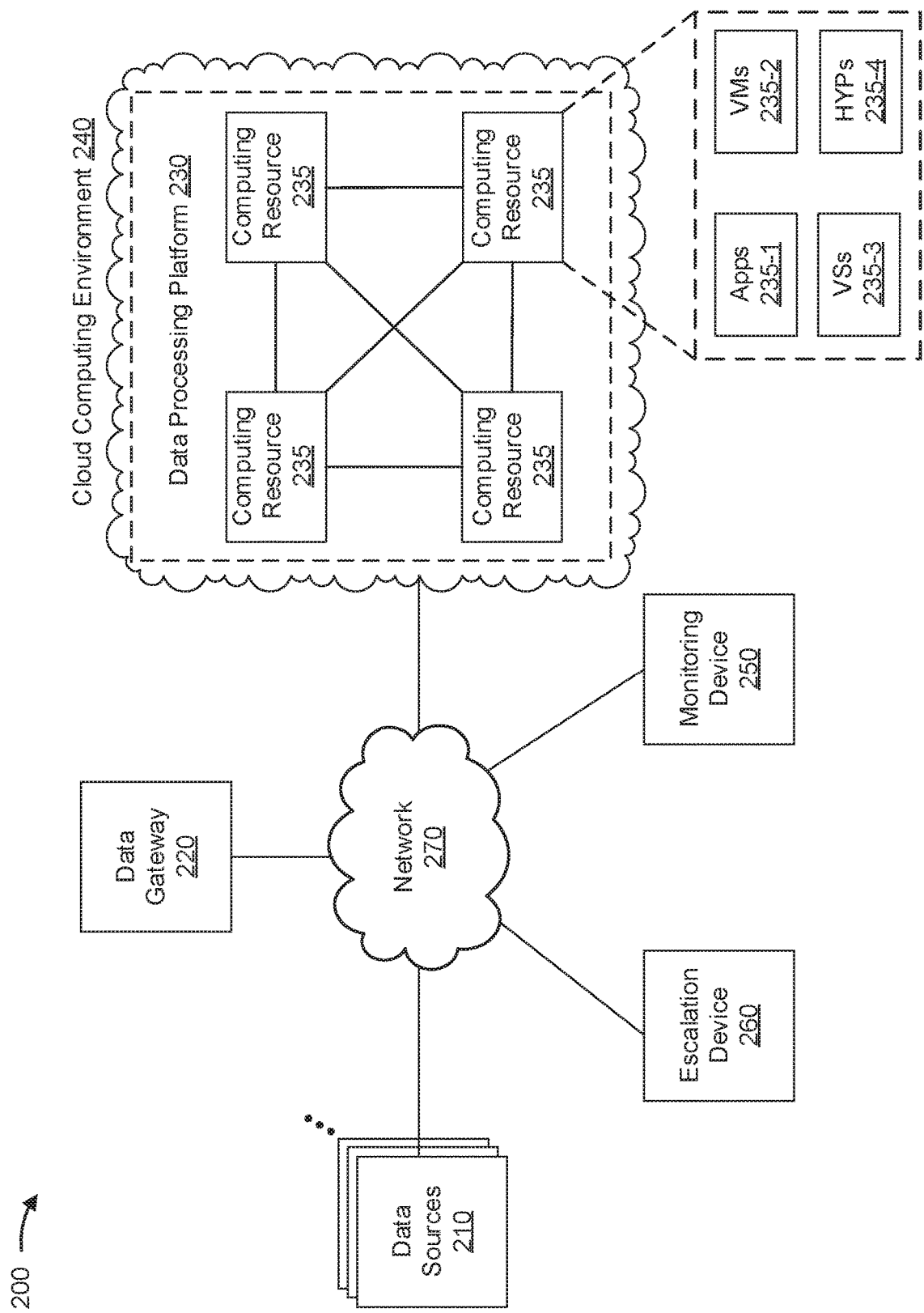
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a data source 210, a data gateway 220, a data processing platform 230, computing resources 235, a cloud computing environment 240, a monitoring device 250, a fault resolution device 255, an escalation device 260, and a network 270. Devices of environment 200 may interconnect via wired connections, wireless connections, or a combination of wired and wireless connections.

Data source 210 includes one or more devices capable of receiving, generating, storing, processing, and/or providing information associated with data processing jobs. For example, data source 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), an IoT device (e.g., a smart speaker, smart thermostat, etc.), server device (e.g., a host server, a web server, an application server, etc.), a data center device, or a similar type of device. Data source 210 may include hardware, or a combination of hardware and software, that enables data source 210 to communicate with data gateway 220, data processing platform, monitoring device 250, and/or escalation device. For example, data source 210 may include a server computer designed to collect data from various different types of devices for use in a data processing job.

Data gateway 220 includes one or more devices capable of receiving, generating, storing, processing, and/or providing information associated with data processing jobs. For example, data gateway 220 may include a server device, a data center device, database storage device, or a similar device. In some implementations, data gateway 220 may include a device capable of providing data processing platform 230 with input data used for various data processing jobs, communicating with data sources 210 to obtain input data used by the data processing platform 230, and communicating with monitoring device 250 to provide input data and/or information relevant to input data. In some implementations data gateway 220 may perform other operations, such as pre-processing input data received from data sources 210, e.g., in a manner designed to prepare the input data for processing by data processing platform 230.

Data processing platform 230 includes one or more devices capable of receiving, generating, storing, processing, and/or providing information associated with data processing jobs. For example, data processing platform 230 may include a server device (e.g., a host server, a web server, an application server, etc.), a data center device, or a similar device. For example, data processing platform 230 may be capable of receiving input data from data gateway 220 and performing a variety of data processing jobs using the input data. Data processing platform 230 may also be capable of providing error data associated with errors encountered during the performance of data processing jobs, e.g., by providing error data to a data structure that is accessible to another device or devices, such as monitoring device 250.

In some implementations, as shown, data processing platform 230 may be hosted in cloud computing environment 240. Notably, while implementations described herein describe data processing platform 230 as being hosted in cloud computing environment 240, in some implementations, data processing platform 230 might not be cloud-based (i.e., may be implemented outside of a cloud computing environment) or might be partially cloud-based.

Cloud computing environment 240 includes an environment that delivers computing as a service, whereby shared resources, services, etc. may be provided to perform data processing jobs. Cloud computing environment 240 may provide computation, software, data access, storage, and/or other services that do not require end-user knowledge of a physical location and configuration of a system and/or a device that delivers the services. As shown, cloud computing environment 240 may include data processing platform 230 and computing resource 235.

Computing resource 235 includes one or more personal computers, workstation computers, server devices, or another type of computation and/or communication device. In some implementations, computing resource 235 may host data processing platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by other devices, such as data sources 210, data gateway 220, monitoring device 250, and/or the like. Application 235-1 may eliminate a need to install and execute the software applications on other devices, such as data sources 210, data gateway 220, monitoring device 250, and/or the like. For example, application 235-1 may include software associated with data processing platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., a user associated with data sources 210, data gateway 220, monitoring device 250, and/or the like), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Monitoring device 250 includes one or more devices capable of receiving, generating, storing, processing, and/or providing information associated with data processing jobs. For example, monitoring device 250 may include a personal computer, server device, a data center device, or a similar device. For example, monitoring device 250 may be capable of generating or obtaining error data based on communications with data gateway 220 and/or data processing platform 230. Monitoring device 250 may use error data to determine the type of error and take action designed to correct errors associated with input data, such as missing or faulty input data.

While depicted as a separate individual device, in some implementations, monitoring device 250 may be hosted in cloud computing environment 240, alone or in combination with data processing platform 230.

Fault resolution device 255 includes one or more devices capable of receiving, generating, storing, processing, and/or providing information associated with data processing jobs. For example, fault resolution device 255 may include a personal computer, server device, a data center device, or a similar device. Fault resolution device 255 may be capable of obtaining faulty input data based on communications with monitoring device 250 and/or data processing platform 230. Fault resolution device 255 may use correct faulty input data, for example, using a combination of hardware and software to identify faulty portions of input data and correct the faults in a predetermined manner. For example, fault resolution device 255 may include or otherwise have access to format data specifying the expected format for input data, and when correcting input data that does not match the expected format, the fault resolution device 255 may correct the faults in predetermined ways (e.g., removing and/or replacing un-supported characters, re-arranging the order of characters or fields included in input data, and/or the like).

While depicted as a separate individual device, in some implementations, fault resolution device 255 may be hosted in cloud computing environment 240, alone or in combination with data processing platform 230, and/or combined with monitoring device 250.

Escalation device 260 includes one or more devices capable of receiving, generating, storing, processing, and/or providing information associated with data processing jobs. For example, escalation device 260 may include a communication and/or computing device, such as a mobile phone, a laptop computer, a tablet computer, a handheld computer, a gaming device, a wearable communication device, an IoT device, server device, a data center device, or a similar type of device. Escalation device 260 may include hardware, or a combination of hardware and software, that enables escalation device 260 to communicate with data sources 210, data gateway 220, data processing platform 230, and/or monitoring device 250. For example, escalation device 260 may include a personal computer associated with a system administrator responsible for escalating errors identified by monitoring device 250 and associated with data processing platform 230.

While depicted as a separate individual device, in some implementations, escalation device 260 may be hosted in cloud computing environment 240, alone or in combination with data processing platform 230.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to data source 210, data gateway 220, data processing platform 230, computing resource 235, monitoring device 250, fault resolution device 255, and/or escalation device 260. In some implementations, data source 210, data gateway 220, data processing platform 230, computing resource 235, monitoring device 250, fault resolution device 255, and/or escalation device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for monitoring a data processing platform. In some implementations, one or more process blocks of FIG. 4 may be performed by monitoring device 250. In some implementations, one or more process blocks of FIG. 4 may be performed by another device or a group of devices separate from or including monitoring device 250, such as a data source 210, data gateway 220, data processing platform 230, computing resource 235, and/or escalation device 260.

As shown in FIG. 4, process 400 may include receiving error data indicating that an error occurred (block 410). For example, monitoring device 250 (e.g., using processor 320, input component 350, communications interface 370, and/or the like) may receive error data indicating that an error occurred. The error may be associated with a data processing job scheduled to be performed by a data processing platform 230, as described above in connection with FIGS. 1A-1B.

As further shown in FIG. 4, process 400 may include identifying input data for a data processing job associated with the error (block 420). For example, the monitoring device (e.g., using processor 320, memory 330, storage component 340, output component 360, communications interface 370, and/or the like) may identify input data for the data processing job associated with the error, as described above in connection with FIGS. 1A-1B.

As further shown in FIG. 4, process 400 may include determining that the error is based on a data processing platform not receiving the input data (block 430). For example, the monitoring device (e.g., using processor 320, memory 330, storage component 340, output component 360, communications interface 370, and/or the like) may determine that the error is based on the data processing platform not receiving the input data, as described above in connection with FIGS. 1A-1B.

As further shown in FIG. 4, process 400 may include determining a location of the input data (block 440). For example, the monitoring device (e.g., using processor 320, memory 330, storage component 340, output component 360, communications interface 370, and/or the like) may determine the location of the input data, as described above in connection with FIGS. 1A-1B.

As further shown in FIG. 4, process 400 may include determining a measure of priority associated with the data processing job (block 450). For example, the monitoring device (e.g., using processor 320, memory 330, storage component 340, output component 360, communications interface 370, and/or the like) may determine a measure of priority associated with the data processing job, as described above in connection with FIGS. 1A-1B.

As further shown in FIG. 4, process 400 may include performing an action to correct the error, based on the location of the input data and the measure of priority (block 460). For example, the monitoring device (e.g., using processor 320, memory 330, storage component 340, output component 360, communications interface 370, and/or the like) may perform an action to correct the error, based on the location of the input data and the measure of priority, as described above in connection with FIGS. 1A-1B.

Process 400 may include additional implementations, such as any single implementation or any combination of implementations described below and/or in connection with FIGS. 5 and/or 6 below.

In some implementations, determining the location of the input data may include determining that the input data is stored in a data storage device (e.g., data gateway 220) accessible to the device (e.g., monitoring device 250), and performing the action based on the location of the input data and the measure of priority may include providing the data storage device with a request to provide the input data to the data processing platform.

In some implementations, determining the location of the input data may include determining that the input data is stored by a third party device (e.g., data source 210) and not accessible to the device (e.g., monitoring device 250), and performing the action based on the location of the input data and the measure of priority may include providing the third party device with a request to provide the input data to the data processing platform.

In some implementations, determining the location of the input data may include determining that the input data is stored in a data storage device accessible to the data processing platform, and performing the action based on the location of the input data and the measure of priority may include providing the data processing platform with data specifying the location of the input data.

In some implementations, performing the action based on the location of the input data and the measure of priority may include providing, based on the measure of priority meeting a threshold measure of priority, another device (e.g., escalation device 260) with data identifying the location of the input data to permit the other device to escalate obtaining the input data based on the data identifying the location of the input data. In some implementations, determining the location of the input data may include identifying an expected format for the input data and determining the location of the input data by searching for data having a format that matches the expected format. In some implementations, process 400 may include monitoring an error log associated with the data processing platform, and the error data is received from the error log.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for correcting faults associated with a data processing platform. In some implementations, one or more process blocks of FIG. 5 may be performed by monitoring device 250. In some implementations, one or more process blocks of FIG. 5 may be performed by another device or a group of devices separate from or including monitoring device 250, such as a data source 210, data gateway 220, data processing platform 230, computing resource 235, and/or escalation device 260.

As shown in FIG. 5, process 500 may include receiving error data indicating that a data processing platform encountered an error (block 510). For example, the monitoring device (e.g., using processor 320, input component 350, communications interface 370, and/or the like) may receive error data indicating that a data processing platform encountered an error, where the error is associated with a data processing job, as described above in connection with FIGS. 1A-1B.

As further shown in FIG. 5, process 500 may include determining that the error is based on a fault with a format of input data associated with a data processing job (block 520). For example, the monitoring device (e.g., using processor 320, memory 330, storage component 340, input component 350, output component 360, communications interface 370, and/or the like) may determine that the error is based on a fault with a format of input data associated with the data processing job, as described above in connection with FIGS. 1A-1B.

As further shown in FIG. 5, process 500 may include identifying an intended format for the input data (block 530). For example, the monitoring device (e.g., using processor 320, memory 330, storage component 340, input component 350, output component 360, communications interface 370, and/or the like) may identify an intended format for the input data, as described above in connection with FIGS. 1A-1B.

As further shown in FIG. 5, process 500 may include identifying a faulty portion of the input data based on the intended format (block 540). For example, the monitoring device (e.g., using processor 320, memory 330, storage component 340, input component 350, output component 360, communications interface 370, and/or the like) may identify a faulty portion of the input data based on the intended format, where the faulty portion includes the fault, as described above in connection with FIGS. 1A-1B.

As further shown in FIG. 5, process 500 may include generating corrected input data based on the intended format and the faulty portion (block 550). For example, the monitoring device (e.g., using processor 320, memory 330, storage component 340, input component 350, output component 360, communications interface 370, and/or the like) may generate corrected input data based on the intended format and the faulty portion, as described above in connection with FIGS. 1A-1B.

As further shown in FIG. 5, process 500 may include providing the data processing platform with data that causes the data processing platform to perform the data processing job using the corrected input data (block 560). For example, the monitoring device (e.g., using processor 320, memory 330, storage component 340, input component 350, output component 360, communications interface 370, and/or the like) may provide the data processing platform with data that causes the data processing platform to perform the data processing job using the corrected input data, as described above in connection with FIGS. 1A-1B.

Process 500 may include additional implementations, such as any single implementation or any combination of implementations described below or above with respect to FIGS. 4 and/or 6.

In some implementations, monitoring the data processing platform may include monitoring a data structure that stores error log data produced by the data processing platform, and monitoring the data structure may include periodically monitoring the data structure.

In some implementations, determining that the error is based on the fault with the format of the input data associated with the data processing job may include determining that the format of the input data does not match the intended format, and determining that the format of the input data does not match the intended format may be performed using a regular expression.

In some implementations, the error data may be received from a job scheduler device associated with the data processing platform.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for monitoring and correcting faults associated with a data processing platform. In some implementations, one or more process blocks of FIG. 6 may be performed by monitoring device 250. In some implementations, one or more process blocks of FIG. 6 may be performed by another device or a group of devices separate from or including monitoring device 250, such as a data source 210, data gateway 220, data processing platform 230, computing resource 235, and/or escalation device 260.

As shown in FIG. 6, process 600 may include monitoring a data processing platform (block 610). For example, the monitoring device (e.g., using processor 320, memory 330, storage component 340, input component 350, output component 360, communications interface 370, and/or the like) may monitor a data processing platform, as described above in connection with FIGS. 1A-1B.

As further shown in FIG. 6, process 600 may include determining that the data processing platform is scheduled to perform a data processing job (block 620). For example, the monitoring device (e.g., using processor 320, memory 330, storage component 340, input component 350, output component 360, communications interface 370, and/or the like) may determine that the data processing platform is scheduled to perform a data processing job, as described above in connection with FIGS. 1A-1B.

As further shown in FIG. 6, process 600 may include determining that the input data needed for the data processing job is missing or incorrect (block 630). For example, the monitoring device (e.g., using processor 320, memory 330, storage component 340, input component 350, output component 360, communications interface 370, and/or the like) may determine that the input data needed for the data processing job is missing or incorrect, as described above in connection with FIGS. 1A-1B.

As further shown in FIG. 6, process 600 may include determining a location of the input data (block 640). For example, the monitoring device (e.g., using processor 320, memory 330, storage component 340, input component 350, output component 360, communications interface 370, and/or the like) may determine the location of the input data, as described above in connection with FIGS. 1A-1B.

As further shown in FIG. 6, process 600 may include identifying, based on the location of the input data, corrected input data that corrects the input data that is missing or incorrect (block 650). For example, the monitoring device (e.g., using processor 320, memory 330, storage component 340, input component 350, output component 360, communications interface 370, and/or the like) may identify, based on the location of the input data, corrected input data that corrects the input data that is missing or incorrect, as described above in connection with FIGS. 1A-1B.

As further shown in FIG. 6, process 600 may include causing the corrected input data to be provided to the data processing platform to permit the data processing platform to perform the data processing job (block 660). For example, the monitoring device (e.g., using processor 320, memory 330, storage component 340, input component 350, output component 360, communications interface 370, and/or the like) may cause the corrected input data to be provided to the data processing platform to permit the data processing platform to perform the data processing job, as described above in connection with FIGS. 1A-1B.

Process 600 may include additional implementations, such as any single implementation or any combination of implementations described above with respect to FIGS. 4 and/or 5.

In some implementations, monitoring the data processing platform may include determining an expected input data location associated with the data processing job; and prior to a scheduled execution time for the data processing job, monitoring the expected input data location for the input data.

In some implementations, process 600 may include searching for the input data at an expected input data location, the expected input data location being previously configured for the data processing job; and determining that the data processing platform encountered an error based on the input data not being available at the expected input data location.

In some implementations, process 600 may include providing the data processing platform with data identifying the location of the input data; and providing the data processing platform with data that causes the data processing platform to perform the data processing job based on the location of the input data.

In some implementations, process 600 may include providing, to a device (e.g., data source 210) associated with the location of the input data, a request that causes the device to make the input data available at an expected input data location; identifying a measure of priority associated with the data processing job; and providing, based on the measure of priority, the data processing platform with data that causes the data processing platform to perform the data processing job.

In some implementations, process 600 may include identifying a measure of priority associated with the data processing job; and providing, based on the measure of priority, another device (e.g., escalation device 260) with data identifying the location of the input data to permit the other device to escalate obtaining the input data based on the data identifying the location of the input data.

In some implementations, process 600 may include identifying a measure of priority associated with the data processing job; determining a delay based on the measure of priority; and scheduling, based on the delay, the data processing job.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, a monitoring device 250 may monitor and correct faults related to the input data used by a data processing platform 230 to perform data processing jobs. The ability to monitor and correct faults in input data may significantly reduce computing resources (e.g., processing resources, memory resources, data storage resources, network bandwidth resources, and/or the like) that might otherwise be used attempting to perform data processing jobs with missing or erroneous input data. In addition, by enabling the quick correction of faults related to input data, the monitoring device 250 may further conserve computing resources by preventing potential issues with related jobs (e.g., in a situation where an error in one data processing job might affect the performance of other data processing jobs, such as data processing jobs that are dependent on one another). In some implementations, the monitoring device 250 may facilitate data processing job scheduling by monitoring and correcting errors in a manner designed to enable faulty data processing jobs to be scheduled, and/or re-scheduled, quickly and in accordance with a priority scheme (e.g., causing data processing jobs to be scheduled based on relative importance). In addition, the monitoring device 250 may also facilitate escalation processes regarding faults with a data processing platform 230, providing entities within an organization related to the data processing platform 230 with information enabling the entities to handle faults that are not directly corrected by the monitoring device 250.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, error data identifying an error associated with a data processing job scheduled to be performed by a data processing platform;
   determining, by the device, that the error is based on input data not being available for the data processing platform,
      wherein determining that the error is based on the input data not being available for the data processing platform is based on checking a format of the input data to determine whether the input data would produce errors;
   determining, by the device and based on an upcoming processing job based on a data processing job schedule, an expected location of the input data;
   determining, by the device, a measure of priority associated with the data processing job; and
   performing, by the device, an action to correct the error, based on the expected location of the input data and the measure of priority,
      wherein performing the action comprises:
         prioritizing handling the error based on the measure of priority relative to handling another error for another data processing job with another measure of priority, and
         generating or removing particular data to correct the format of particular input data associated with the expected location of the input data.

2. The method of claim 1, further comprising:
   requesting, from a data source and prior to receiving the error data, the input data; and
   wherein receiving the error data comprises:
      receiving the error data based on requesting the input data.

3. The method of claim 1, further comprising:
   producing escalation data indicating that the input data is not available at the expected location; and
   providing, to another device associated with providing the input data, the escalation data.

4. The method of claim 1, further comprising:
   determining, based on the data processing job schedule, that the data processing job is scheduled for a particular time; and
   determining, prior to the particular time, whether the input data is available at the expected location; and
   wherein receiving the error data comprises:
      receiving the error data based on determining that the input data is not available at the expected location.

5. The method of claim 1, wherein performing the action comprises:
   providing, based on the measure of priority meeting a threshold measure of priority, another device with data identifying the expected location to permit the other device to escalate obtaining the input data based on the data identifying the expected location.

6. The method of claim 1, further comprising:
   identifying a data source associated with the input data; and
   providing the data source with a request for the input data.

7. The method of claim 6, wherein providing the data source with the request comprises:
   providing the data source with the request via an application programming interface (API) call to an application server associated with the data source.

8. A device, comprising:
one or more memories; and
one or more processors communicatively coupled to the one or more memories, configured to:
receive error data identifying an error associated with a data processing job scheduled to be performed by a data processing platform;
determine that the error is based on input data not being available for the data processing platform,
wherein the one or more processors, to determine that the error is based on the input data not being available for the data processing platform, are configured to determine that the error is based on the input data not being available for the data processing platform based on checking a format of the input data to determine whether the input data would produce errors;
determine, based on an upcoming processing job based on a data processing job schedule, an expected location of the input data;
determine a measure of priority associated with the data processing job; and
perform an action to correct the error, based on the expected location of the input data and the measure of priority,
wherein the one or more processors, to perform the action, are configured to:
prioritize handling the error based on the measure of priority relative to handling another error for another data processing job with another measure of priority, and
generate or remove particular data to correct the format of particular input data associated with the expected location of the input data.

9. The device of claim 8, wherein the one or more processors are further configured to:
request, from a data source and prior to receiving the error data, the input data; and
wherein the one or more processors, when receiving the error data, are configured to:
receive the error data based on requesting the input data.

10. The device of claim 8, wherein the one or more processors are further configured to:
produce escalation data indicating that the input data is not available at the expected location; and
provide, to another device associated with providing the input data, the escalation data.

11. The device of claim 8, wherein the one or more processors are further configured to:
determine, based on the data processing job schedule, that the data processing job is scheduled for a particular time; and
determine, prior to the particular time, whether the input data is available at the expected location; and
wherein the one or more processors, when receiving the error data, are configured to:
receive the error data based on determining that the input data is not available at the expected location.

12. The device of claim 8, wherein the one or more processors, when performing the action, are configured to:
provide, based on the measure of priority meeting a threshold measure of priority, another device with data identifying the expected location to permit the other device to escalate obtaining the input data based on the data identifying the expected location.

13. The device of claim 8, wherein the one or more processors are further configured to:
identify a data source associated with the input data; and
provide the data source with a request for the input data.

14. The device of claim 13, wherein the one or more processors, when providing the data source with the request, are configured to:
provide the data source with the request via an application programming interface (API) call to an application server associated with the data source.

15. A non-transitory computer-readable medium storing instructions, the instructions comprising:
one or more instructions that, when executed by one or more processors, cause the one or more processors to:
receive error data identifying an error associated with a data processing job scheduled to be performed by a data processing platform;
determine that the error is based on input data not being available for the data processing platform,
wherein the one or more instructions, that cause the one or more processors to determine that the error is based on the input data not being available for the data processing platform, cause the one or more processors to determine that the error is based on the input data not being available for the data processing platform based on checking a format of the input data to determine whether the input data would produce errors;
determine, based on an upcoming processing job based on a data processing job schedule, an expected location of the input data;
determine a measure of priority associated with the data processing job; and
perform an action to correct the error, based on the expected location of the input data and the measure of priority,
wherein the one or more processors, to perform the action, are configured to:
prioritize handling the error based on the measure of priority relative to handling another error for another data processing job with another measure of priority, and
generate or remove particular data to correct the format of particular input data associated with the expected location of the input data to determine whether the particular input data would produce errors.

16. The non-transitory computer-readable medium of claim 15, wherein the one or more instructions, when executed by the one or more processors, further cause the one or more processors to:
request, from a data source and prior to receiving the error data, the input data; and
wherein the one or more instructions, that cause the one or more processors to receive the error data, cause the one or more processors to:
receive the error data based on requesting the input data.

17. The non-transitory computer-readable medium of claim 15, wherein the one or more instructions, when executed by the one or more processors, further cause the one or more processors to:
produce escalation data indicating that the input data is not available at the expected location; and
provide, to another device associated with providing the input data, the escalation data.

18. The non-transitory computer-readable medium of claim 15, wherein the one or more instructions, when executed by the one or more processors, further cause the one or more processors to:
- determine, based on the data processing job schedule, that the data processing job is scheduled for a particular time; and
- determine, prior to the particular time, whether the input data is available at the expected location; and
- wherein the one or more instructions, that cause the one or more processors to receive the error data, cause the one or more processors to:
  - receive the error data based on determining that the input data is not available at the expected location.

19. The non-transitory computer-readable medium of claim 15, wherein the one or more instructions, that cause the one or more processors to perform the action, cause the one or more processors to:
- provide, based on the measure of priority meeting a threshold measure of priority, another device with data identifying the expected location to permit the other device to escalate obtaining the input data based on the data identifying the expected location.

20. The non-transitory computer-readable medium of claim 15, wherein the one or more instructions, when executed by the one or more processors, further cause the one or more processors to:
- identify a data source associated with the input data; and
- provide the data source with a request for the input data.

* * * * *